United States Patent
Tsai et al.

(10) Patent No.: US 11,942,993 B2
(45) Date of Patent: *Mar. 26, 2024

(54) OPTICAL TRANSMISSION DEVICE AND OPTICAL COMMUNICATION SYSTEM

(71) Applicant: Molex, LLC, Lisle, IL (US)

(72) Inventors: Kuen-Ting Tsai, New Taipei (TW); Wei-Hung Chen, New Taipei (TW); Zuon-Min Chuang, Taoyuan (TW); Yao-Wen Liang, Hsinchu (TW)

(73) Assignee: Molex, LLC, Lisle, IL (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/784,104

(22) PCT Filed: Dec. 18, 2020

(86) PCT No.: PCT/US2020/065783
§ 371 (c)(1),
(2) Date: Jun. 10, 2022

(87) PCT Pub. No.: WO2021/127299
PCT Pub. Date: Jun. 24, 2021

(65) Prior Publication Data
US 2023/0034936 A1    Feb. 2, 2023

(30) Foreign Application Priority Data
Dec. 20, 2019    (CN) .......................... 201911323318.2

(51) Int. Cl.
*H04B 10/2513* (2013.01)
*G02F 1/21* (2006.01)
(Continued)

(52) U.S. Cl.
CPC ....... *H04B 10/25137* (2013.01); *G02F 1/212* (2021.01); *H04B 1/69* (2013.01);
(Continued)

(58) Field of Classification Search
CPC ............ H04B 10/25137; H04B 10/524; H04B 10/541; H04B 2001/6912; G02F 1/212
(Continued)

(56) References Cited

U.S. PATENT DOCUMENTS

| 5,303,079 A | 4/1994 | Gnauck et al. |
| 5,408,544 A | 4/1995 | Seino |

(Continued)

FOREIGN PATENT DOCUMENTS

| CN | 2552019 Y | 5/2003 |
| CN | 107104736 A | 8/2017 |

(Continued)

OTHER PUBLICATIONS

Hao et al; High-performance optical modulators bias control system without dither; 2013; Science Direct; pp. 1-3. (Year: 2013).*

(Continued)

*Primary Examiner* — Amritbir K Sandhu (57) ABSTRACT

An optical transmission device includes: a control module generate a control signal output which includes a slope adjust signal and a bias voltage offset adjust signal according to an input signal indicating a dispersion amount an electrical level adjust signal; a multi-level pulse amplitude modulator; and an asymmetrical optical modulator which is controlled by the slope adjust signal to be operated at one of a positive slope and a negative slope of a transfer function of the asymmetrical optical modulator itself, and is controlled by the bias voltage offset adjust signal of the control signal output to offset a bias voltage point of the asymmetrical optical modulator itself from a quadrature point of the transfer function, and modulates the multi-level pulse amplitude modulation signal to an optical signal to generate an optical modulate signal having a chirp.

19 Claims, 7 Drawing Sheets

(51) Int. Cl.
  *H04B 1/69* (2011.01)
  *H04B 10/524* (2013.01)
  *H04B 10/54* (2013.01)
(52) U.S. Cl.
  CPC ......... *H04B 10/524* (2013.01); *H04B 10/541* (2013.01); *H04B 2001/6912* (2013.01)
(58) Field of Classification Search
  USPC ........................................................ 398/183
  See application file for complete search history.

(56) References Cited

U.S. PATENT DOCUMENTS

| | | | |
|---|---|---|---|
| 5,524,076 A | 6/1996 | Rolland et al. | |
| 5,621,560 A | 4/1997 | Wood | |
| 5,991,471 A | 11/1999 | Yu | |
| 6,091,535 A * | 7/2000 | Satoh | H04B 10/505 359/239 |
| 6,381,379 B1 | 4/2002 | Burns | |
| 7,006,769 B1 | 2/2006 | Kawasaki et al. | |
| 7,504,610 B2 * | 3/2009 | Draper | H04B 10/504 250/214 R |
| 8,005,374 B2 * | 8/2011 | Yonenaga | G02F 1/0123 398/208 |
| 8,280,201 B2 | 10/2012 | Prosyk | |
| 9,059,805 B2 * | 6/2015 | Mak | H04B 10/548 |
| 9,323,128 B1 | 4/2016 | Nagarajan et al. | |
| 9,632,390 B1 | 4/2017 | Kato | |
| 10,191,307 B2 * | 1/2019 | Fujita | H04B 10/50575 |
| 10,401,655 B2 * | 9/2019 | Streshinsky | G02F 1/011 |
| 2003/0161580 A1 | 8/2003 | Morin et al. | |
| 2003/0218790 A1 | 11/2003 | Mikkelsen et al. | |
| 2005/0254743 A1 | 11/2005 | Akiyama et al. | |
| 2010/0316324 A1 | 12/2010 | Webster et al. | |
| 2014/0112611 A1 | 4/2014 | Vermeulen et al. | |
| 2017/0054533 A1 | 2/2017 | Sonkin et al. | |
| 2023/0034936 A1 * | 2/2023 | Tsai | H04B 10/2513 |

FOREIGN PATENT DOCUMENTS

| | | | |
|---|---|---|---|
| EP | 1385281 B1 | 12/2009 | |
| EP | 2323287 A1 * | 5/2011 | ........... G02F 1/0123 |
| EP | 2175574 B1 | 12/2012 | |
| JP | 2012128165 A | 7/2012 | |
| WO | 0158057 A1 | 8/2001 | |

OTHER PUBLICATIONS

International Search Report and Written Opinion received for PCT Application No. PCT/US2020/065783, dated Mar. 31, 2021, 08 Pages.

Schiess et al., "Evaluation of the chirp parameter of a Mach-Zehnder intensity modulator", Electronics Letters, vol. 30, No. 18, 1994, pp. 1524-1525.

Yu et al., "10-GB/s Transmission Over 200-km Conventional Fiber Without Dispersion Compensation Using the Bias Control Technique", IEEE Photonics Technology Letters, vol. 14, No. 12, Dec. 2002, pp. 1746-1748.

Zhang Chengliang et al., "Dispersion Accommodation Techniques for High Speed Fiber-optic Communications System", Telecommunications Science, vol. 12, No. 9, Sep. 1996, 7 pgs (English Abstract).

* cited by examiner

OPTICAL TRANSMISSION DEVICE AND OPTICAL COMMUNICATION SYSTEM

RELATED APPLICATIONS

This application is a national phase of PCT/U.S.2020/065783, filed on Dec. 18, 2020, which claims the benefit of priority to Chinese Application No. 201911323318.2, filed on Dec. 20, 2019. The above-referenced applications are hereby incorporated by reference in their entireties.

TECHNICAL FIELD

The present disclosure relates to a transmission device and a communication system, particularly relates to an optical transmission device and an optical communication system.

BACKGROUND

In optical fiber communication systems, optical fiber dispersion is a phenomenon that optical waves are dispersed into optical spectrum components with different wavelengths due to dependence of wave velocity on wavelength. When an optical signal or pulse is projected into, for example, an optical fiber channel, an envelope thereof propagates along the fiber channel at wave group velocities. Since this pulse contains a series of optical spectrum components, each optical spectrum component travels at a different wave group velocity, causing group velocity dispersion (GVD), intramodal dispersion or simple optical fiber dispersion. This dispersion phenomenon also is often referred to as pulse broadening. When the pulse travels along the optical fiber, the optical spectrum components continue to be dispersed in space and time, the pulse will become too wide, a front edge of a pulse overlaps a rear edge of a previous pulse, and Inter symbol interference (ISI) will occur and the bit will be blurred, which causes the optical receiver to be unable to identify the difference between the "0" bit and the "1" bit and results in transmission error. In addition, the dispersion of the optical fiber is directly proportional to a length of the optical fiber, that is, a transmission distance of the optical signal is limited by the dispersion of the optical fiber.

As such, dispersion becomes one of the important factors affecting the signal quality of optical fiber communication. Therefore, how to avoid dispersion seriously affecting the optical fiber communication system in order to promote the optical transmission distance is a subject to be improved by the relevant communication entities.

SUMMARY

Therefore, one object of the present disclosure is to provide an optical transmission device which can overcome the deficiency of the existing technology.

Accordingly, an optical transmission device of the present disclosure comprises a control module, a multi-level pulse amplitude modulator and an asymmetrical optical modulator. The control module is used to receive an input signal indicating a dispersion amount, and generate a control signal output comprising a slope adjust signal and a bias voltage offset adjust signal according to the input signal and an electrical level adjust signal changing as the bias voltage offset adjust signal changes, the slope adjust signal and the bias voltage offset adjust signal respectively change as a polarity and a magnitude of the dispersion amount change. The multi-level pulse amplitude modulator is used to receive a data input, and connects the control module to receive the electrical level adjust signal, and modulates the data input at least according to the electrical level adjust signal, to generate a multi-level pulse amplitude modulation signal. The asymmetrical optical modulator is used to receive an optical signal, and connects the multi-level pulse amplitude modulator and the control module to respectively receive the multi-level pulse amplitude modulation signal and the control signal output, the asymmetrical optical modulator is controlled by the slope adjust signal of the control signal output to be operated at one of a positive slope and a negative slope of a transfer function of the asymmetrical optical modulator itself, and is controlled by the bias voltage offset adjust signal of the control signal output to offset a bias voltage point of the asymmetrical optical modulator itself from a quadrature point of the transfer function, and modulates the multi-level pulse amplitude modulation signal to the optical signal to generate an optical modulate signal having a chirp, a polarity and a magnitude of the chirp respectively change as the slope adjust signal and the bias voltage offset adjust signal change.

Therefore, another object of the present disclosure is to provide an optical communication system which can overcome the deficiency of the existing technology.

Accordingly, an optical communication system of the present disclosure comprises an optical transmission device, an optical amplifier and an optical receiving device. The optical transmission device comprises a control module, a multi-level pulse amplitude modulator and an asymmetrical optical modulator. The control module is used to receive an input signal indicating a dispersion amount and a measuring signal, and generate a control signal output comprising a slope adjust signal and a bias voltage offset adjust signal according to the input signal and the measuring signal, the slope adjust signal and the bias voltage offset adjust signal respectively change as a polarity and a magnitude of the dispersion amount change. The multi-level pulse amplitude modulator is used to receive a data input, and modulates the data input to generate a multi-level pulse amplitude modulation signal. The asymmetrical optical modulator is used to receive an optical signal, and connects the multi-level pulse amplitude modulator and the control module to respectively receive the multi-level pulse amplitude modulation signal and the control signal output, the asymmetrical optical modulator is controlled by the slope adjust signal of the control signal output to be operated at one of a positive slope and a negative slope of a transfer function of the asymmetrical optical modulator itself, and is controlled by the bias voltage offset adjust signal of the control signal output to offset a bias voltage point of the asymmetrical optical modulator itself from a quadrature point of the transfer function, and modulates the multi-level pulse amplitude modulation signal to the optical signal to generate an optical modulate signal having a chirp, a polarity and a magnitude of the chirp respectively change as the slope adjust signal and the bias voltage offset adjust signal change. The optical amplifier connects the asymmetrical optical modulator via an optical fiber to receive the optical modulate signal, and amplifies the optical modulate signal, to generate an optical amplified signal. The optical receiving device connects the optical amplifier to receive the optical amplified signal, and generate a data output according to the optical amplified signal. The detector connects the optical receiving device and the control module, and generates the measuring signal according to the data output and outputs the measuring signal to the control module, the measuring signal indicates one of a Bit Error Rate, a Forward Error Coding and a signal-to-noise ratio of the data output.

The effect of the present disclosure lies in that: adjusting that the asymmetrical optical modulator is operated at the positive slope or the negative slope of the transfer function of the asymmetrical optical modulator itself is used, and that the bias voltage point of the asymmetrical optical modulator offsets from the quadrature point of the transfer function is used, as such, the optical modulate signal transmitted out by the optical transmission device of the present disclosure has the optimized chirp, may lower effect of dispersion caused by the optical fiber on the transmission of the optical communication system, in turn promote transmission performance of the optical communication system and increase optical transmission distance.

BRIEF DESCRIPTION OF THE DRAWINGS

Other features and technical effects of the present disclosure will be apparent in an embodiment referring to the accompanying figures, in which.

DETAILED DESCRIPTION OF THE PREFERRED EMBODIMENTS

Before the present disclosure is described in detail, it should be noted that like elements are denoted by the same reference numerals in the following description.

Figure 1:
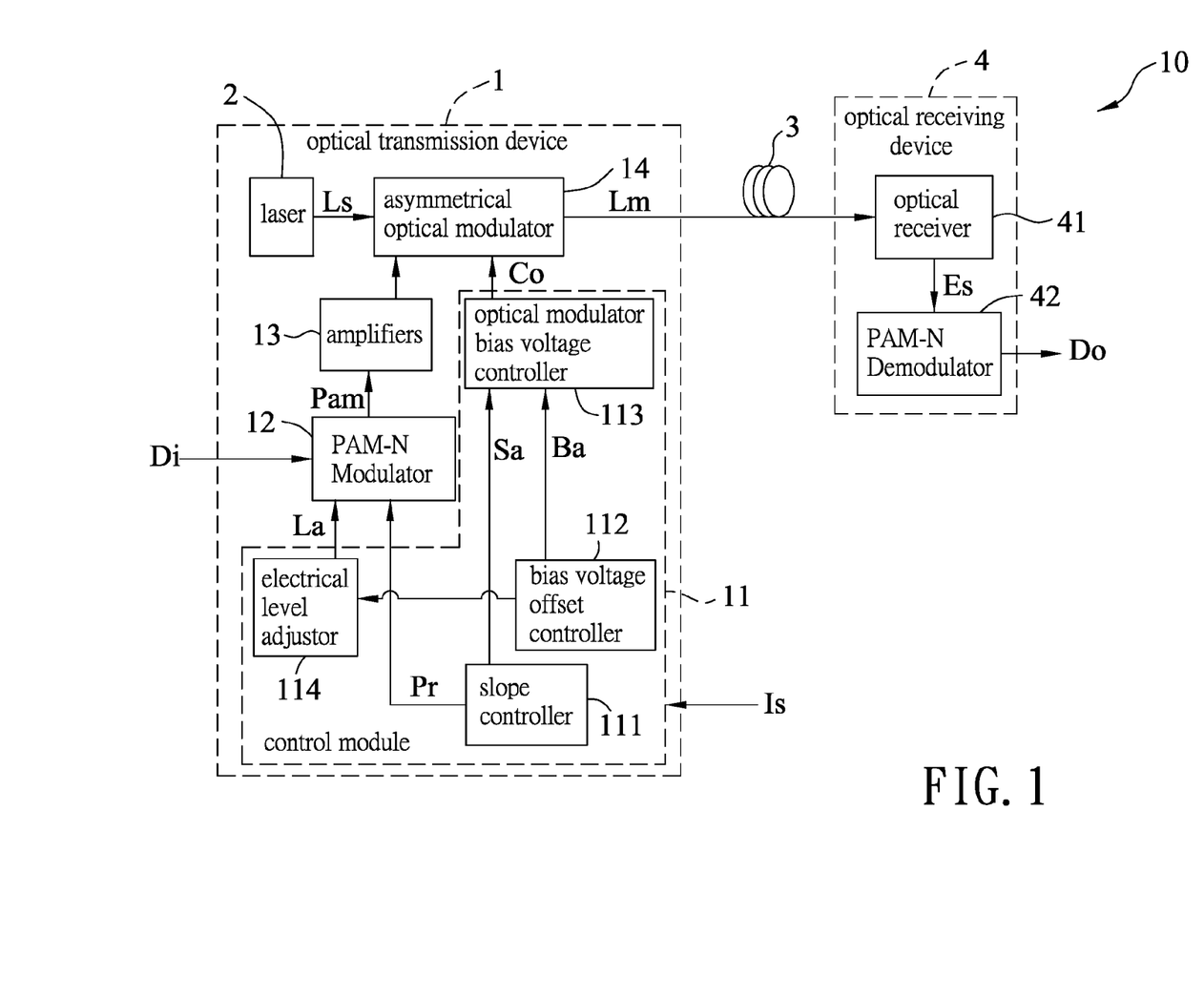
FIG. 1 is a block diagram illustrating a first embodiment that an optical transmission device of the present disclosure is used to an optical communication system.

Referring to FIG. 1, an embodiment of an optical transmission device 1 of the present disclosure is adapted to an optical communication system 10. The optical communication system 10 includes an optical fiber 3 and an optical receiving device 4 which includes an optical receiver 41 and a multi-level pulse amplitude demodulator (PAM-N Demodulator) 42. The optical transmission device 1 is used to modulate an optical signal Ls, which is emitted by a laser 2 inside the optical transmission device 1 and has a continuous wave, to generate an optical modulate signal Lm having a chirp, and transmit the optical modulate signal Lm to the optical receiver 41 via the optical fiber 3. The optical receiver 41 converts the received optical modulate signal Lm to an electrical signal Es and outputs the electrical signal Es to the multi-level pulse amplitude demodulator 42. The multi-level pulse amplitude demodulator 42 demodulates the received electrical signal Es to generate a data output Do.

The optical transmission device 1 of the present embodiment further includes a control module 11, a multi-level pulse amplitude modulator (PAM-N Modulator) 12, an amplifier 13 and an asymmetrical optical modulator 14.

The control module 11 is used to receive an input signal Is indicating a dispersion amount, and generate a control signal output Co including a slope adjust signal Sa and a bias voltage offset adjust signal Ba according to the input signal Is, an electrical level adjust signal La changing as the bias voltage offset adjust signal Ba changes, and a polarity adjust signal Pr changing as the slope adjust signal Sa changes. The slope adjust signal Sa and the bias voltage offset adjust signal Ba respectively change as a polarity and a magnitude (that is, an absolute value of the dispersion amount) of the dispersion amount change. In the present embodiment, the polarity and the magnitude of the dispersion amount are associated with a wavelength of the optical modulate signal Lm and a length of the optical fiber 3. The control module 11 includes a slope controller 111, a bias voltage offset controller 112, an optical modulator bias voltage controller 113 and an electrical level adjustor 114.

The slope controller 111 receives the input signal Is, and generates the slope adjust signal Sa according to the polarity of the dispersion amount of the input signal Is, and generates and outputs the polarity adjust signal Pr according to the slope adjust signal Sa.

The bias voltage offset controller 112 receives the input signal Is, and generates the bias voltage offset adjust signal Ba according to the magnitude of the dispersion amount of the input signal Is.

The optical modulator bias voltage controller 113 connects the slope controller 111 and the bias voltage offset controller 112 to respectively receive the slope adjust signal Sa and the bias voltage offset adjust signal Ba, and generate and output the control signal output Co according to the received slope adjust signal Sa and the received bias voltage offset adjust signal Ba.

The electrical level adjustor 114 connects the bias voltage offset controller 112, and generates and outputs the electrical level adjust signal La according to the bias voltage offset adjust signal Ba.

The multi-level pulse amplitude modulator 12 is used to receive a data input Di (which is a binary data), and connect the slope controller 111 and the electrical level adjustor 114 to respectively receive the polarity adjust signal Pr and the electrical level adjust signal La and perform multi-level pulse amplitude modulation (PAM-N) on the data input Di according to the polarity adjust signal Pr and the electrical level adjust signal La, so as to generate a multi-level pulse amplitude modulation signal Pam. In the present embodiment, the multi-level pulse amplitude modulation signal Pam is a four-level pulse amplitude modulation (PAM-4) signal, and the four-level pulse amplitude modulation signal has a zeroth electrical level, a first electrical level, a second electrical level and a third electrical level.

The amplifier 13 is connected between the multi-level pulse amplitude modulator 12 and the asymmetrical optical modulator 14, and amplifies the multi-level pulse amplitude modulation signal Pam from the multi-level pulse amplitude modulator 12 and outputs to the asymmetrical optical modulator 14.

The asymmetrical optical modulator 14 connects the laser 2 to receive the optical signal Ls, and connects the amplifier 13 and the optical modulator bias voltage controller 113 to respectively receive the multi-level pulse amplitude modulation signal Pam and the control signal output Co. The asymmetrical optical modulator 14 is controlled by the slope adjust signal Sa of the control signal output Co to be operated at one of a positive slope and a negative slope of a transfer function of the asymmetrical optical modulator 14 itself, and is controlled by the bias voltage offset adjust signal Ba of the control signal output Co to offset a bias voltage point of the asymmetrical optical modulator 14 itself from a quadrature point of the transfer function, and modulates the multi-level pulse amplitude modulation signal Pam to the optical signal Ls to generate the optical modulate signal Lm having the chirp. A polarity and a magnitude (that is, an absolute value) of the chirp respectively change as the slope adjust signal Sa and the bias voltage offset adjust signal Ba change.

It is noted that, in the present embodiment, when the polarity of the dispersion amount of the input signal Is is positive polarity, the chirp of the optical modulate signal Lm is negative polarity, when the polarity of the dispersion amount of the input signal Is is negative polarity, the chirp of the optical modulate signal Lm is positive polarity. The asymmetrical optical modulator 14 is a Mach-Zehnder modulator (MZM), the Mach-Zehnder modulator is made of one of a LiNbO3-based, a silicon and an Inp. Moreover, the asymmetrical optical modulator 14 receives the multi-level pulse amplitude modulation signal Pam which is amplified by the amplifier 13, but the present disclosure is not limited thereto. The present embodiment also may omit the amplifier 13, as such, the asymmetrical optical modulator 14 directly connects the multi-level pulse amplitude modulator 12 to receive the multi-level pulse amplitude modulation signal Pam. In addition, the asymmetrical optical modulator 14 may be realized by one of following unbalanced design manners, for example: (1) making the asymmetrical optical modulator 14 have an unbalanced optical splitting ratio; (2) making lengths or shapes of two electrodes (not shown) included by the asymmetrical optical modulator 14 unbalanced; (3) making the two electrodes receive driving signals having different amplitudes; or (4) making PN junction bias voltages of the two electrodes unbalanced, and so on, but the present disclosure is not limited thereto.

Figure 2:
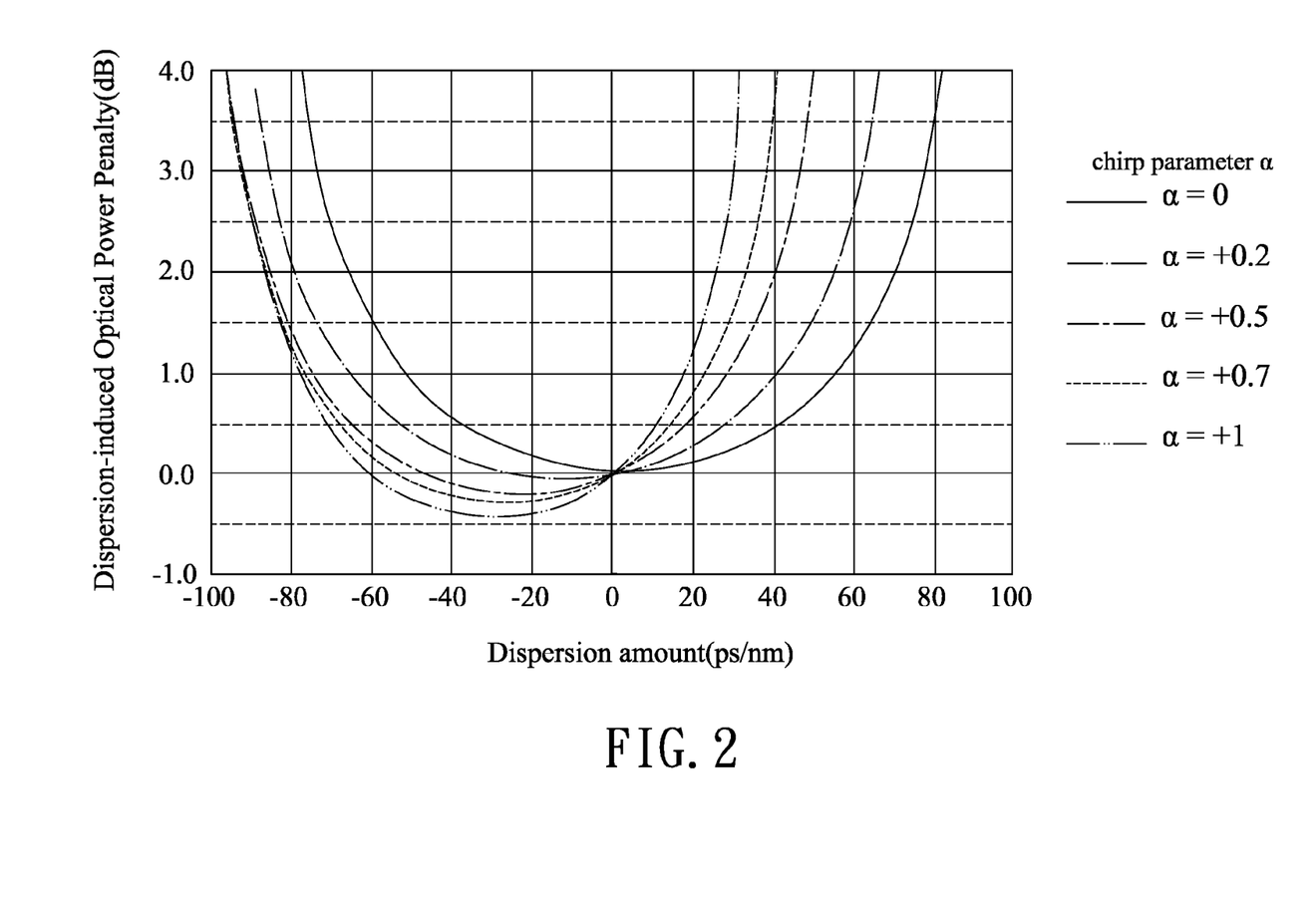
FIG. 2 and FIG. 3 are waveform charts illustrating a relationship among an optical fiber dispersion amount of an input signal, a chirp parameter of an asymmetrical optical modulator and a Dispersion-induced Optical Power Penalty.
Figure 3:
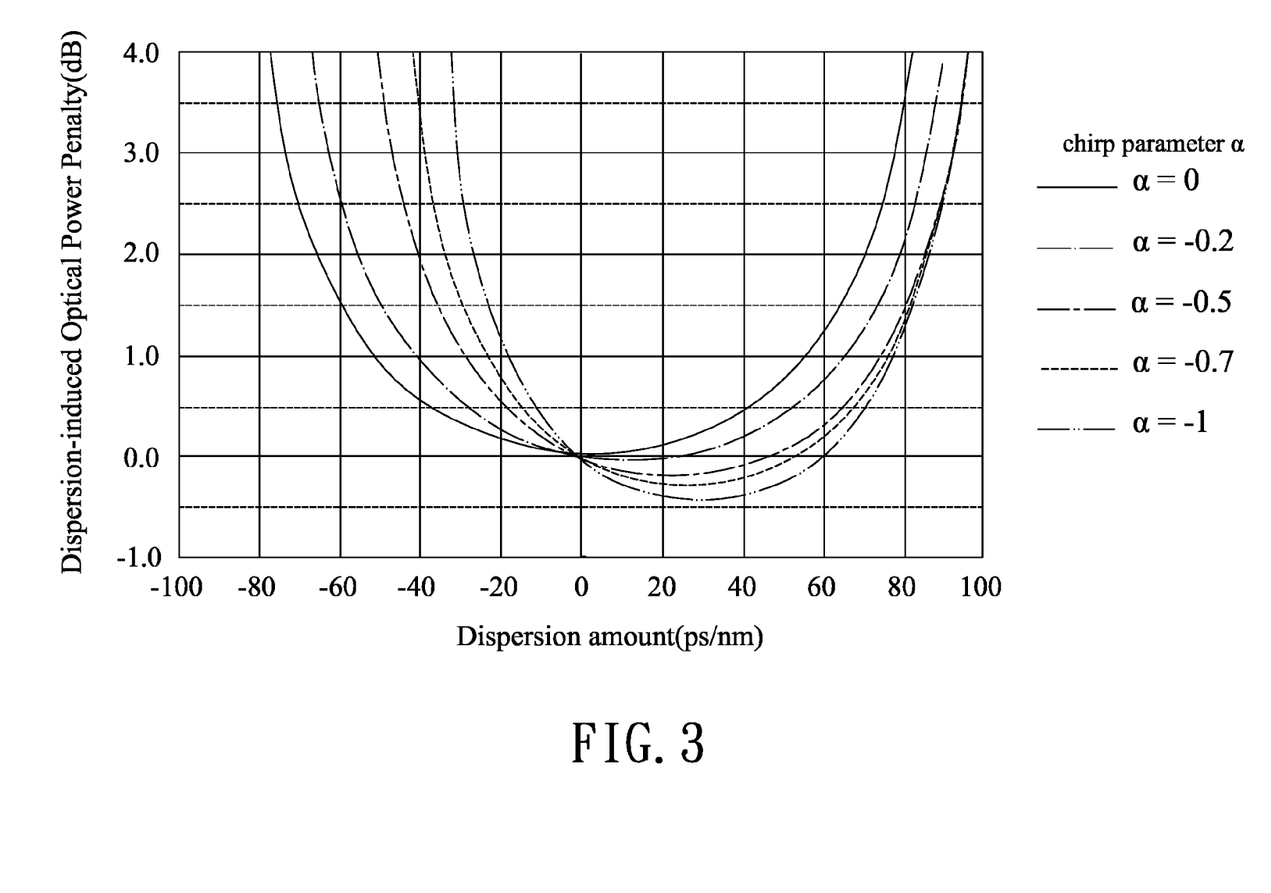

Referring to FIG. 2 and FIG. 3, FIG. 2 and FIG. 3 illustrates a relationship among the dispersion amount of the input signal Is (as shown in the horizontal axis of the figures), a chirp parameter had by the asymmetrical optical modulator 14 (a parameter a as the chirp parameter in the figures) and the Dispersion-induced Optical Power Penalty (that is, as shown in the vertical axis in the figures) of the optical modulate signal Lm received by the optical receiver 41 when the optical modulate signal Lm is a 53.125 GBd four-level pulse amplitude modulation (PAM4) optical signal. As may be seen from FIG. 2, when the dispersion amount is negative polarity, that the chirp parameter of the asymmetrical optical modulator 14 is positive polarity indeed may make the Dispersion-induced Optical Power Penalty of the optical modulate signal Lm become small. As may be seen from FIG. 3, when the dispersion amount is positive polarity, that the chirp parameter of the asymmetrical optical modulator 14 is negative polarity indeed may make the Dispersion-induced Optical Power Penalty of the optical modulate signal Lm become small. Therefore, the optical transmission device 1 of the present disclosure makes the optical modulate signal Lm have the optimized chirp, to lower effect of dispersion caused by the optical fiber 3 on transmission of the optical communication system 10, in turn promote the optical transmission distance of the optical communication system 10. Hereinafter an operation of the optical transmission device 1 of the present embodiment is described by way of example, and an order performed with respect to the slope controller 111 and the bias voltage offset controller 112 is not limited thereto.

Figure 4:
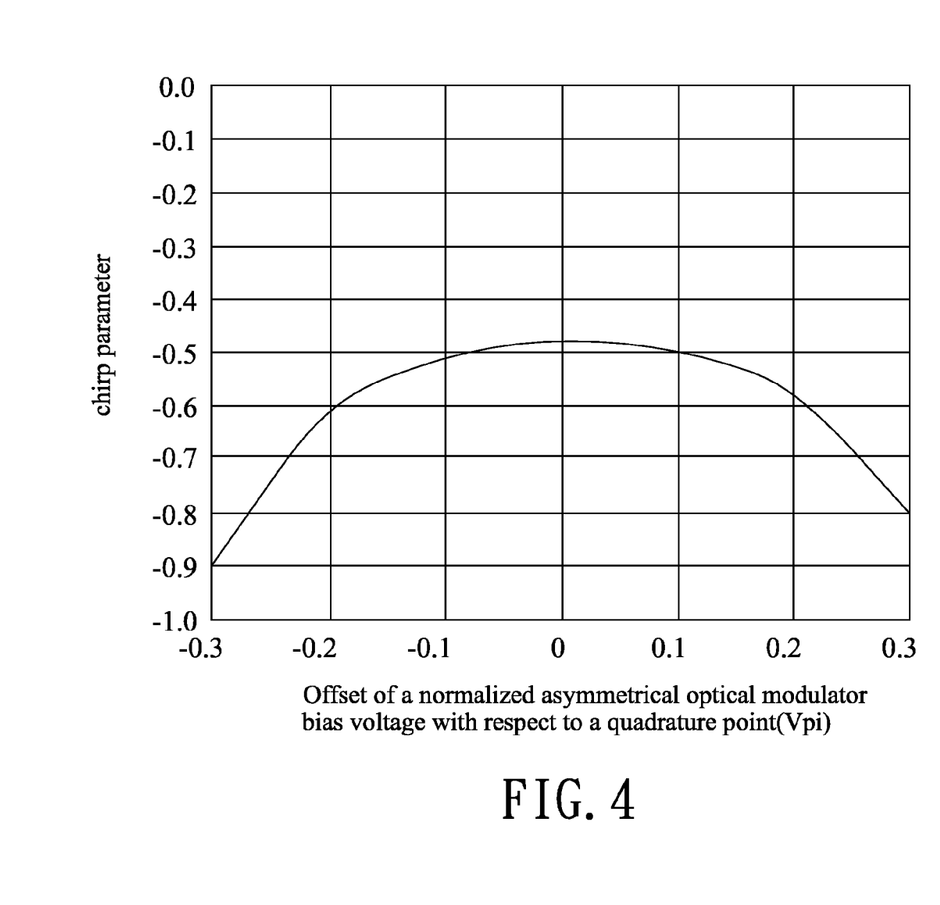
FIG. 4 is a waveform chart illustrating a relationship between the chirp parameter of the asymmetrical optical modulator and a normalized offset of a bias voltage of the asymmetrical optical modulator when the asymmetrical optical modulator is operated at a positive slope of a transfer function.
Figure 5:
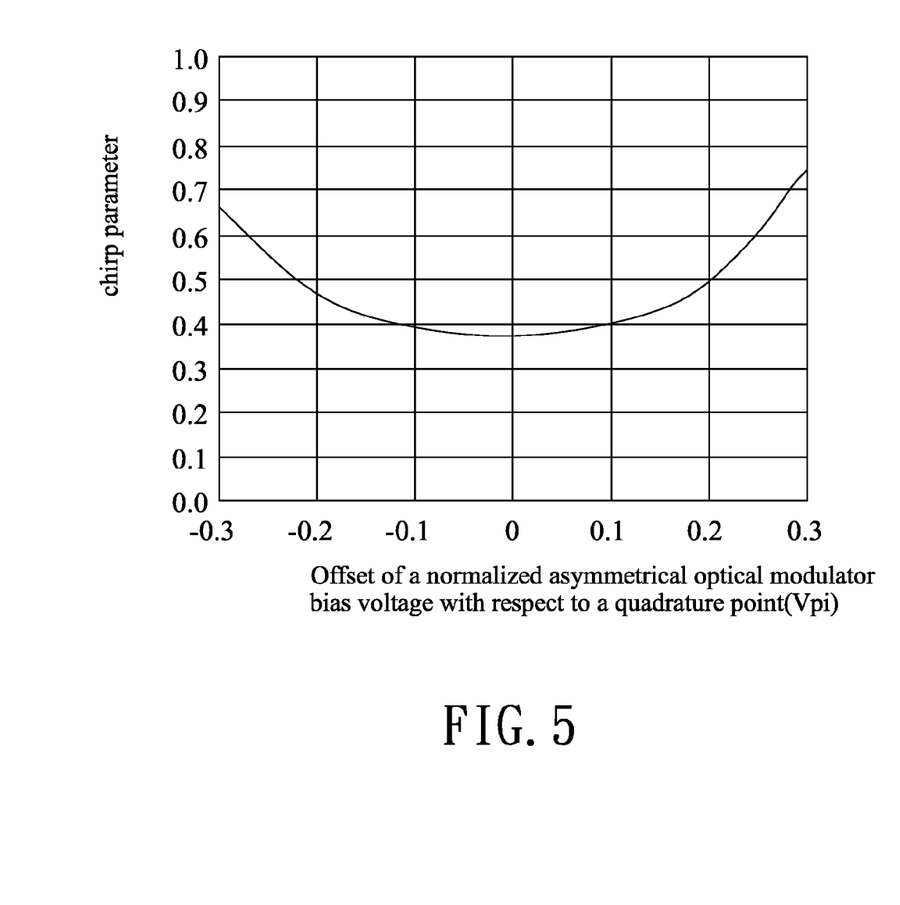
FIG. 5 is a waveform chart illustrating a relationship between the chirp parameter of the asymmetrical optical modulator and the normalized offset of the bias voltage of the asymmetrical optical modulator when the asymmetrical optical modulator is operated at a negative slope of the transfer function.

Specifically, the polarity of the chirp parameter of the asymmetrical optical modulator 14 is associated with that the asymmetrical optical modulator 14 is operated at the positive slope or the negative slope of the transfer function of the asymmetrical optical modulator 14 itself, and the magnitude of the chirp parameter of the asymmetrical optical modulator 14 is associated with an offset between the bias voltage point of the asymmetrical optical modulator 14 and the quadrature point of the transfer function. For example, as shown in FIG. 4, FIG. 4 illustrates a relationship between the chirp parameter of the asymmetrical optical modulator 14 (as shown in the vertical axis of the figure) and the offset of the bias voltage point of the asymmetrical optical modulator 14 and the quadrature point of the transfer function (as shown in the horizontal axis of the figure) when the asymmetrical optical modulator 14 is operated at the positive slope of the transfer function. Moreover, when that the asymmetrical optical modulator 14 is operated at the positive slope of the transfer function is changed to that the asymmetrical optical modulator 14 is operated at the negative slope of the transfer function according to the change of the slope adjust signal Sa, a relationship between the chirp parameter of the asymmetrical optical modulator 14 and the offset of the bias voltage point of the asymmetrical optical modulator 14 and the quadrature point of the transfer function is shown as in FIG. 5. As may be seen from FIGS. 4 and 5, larger the offset between the bias voltage point and the quadrature point is, larger the magnitude of the absolute value of the chirp parameter is. In addition, the polarity of the chirp parameter may be adjusted by the positive slope or the negative slope of the transfer function.

As such, in operation, the slope controller 111 generates the slope adjust signal Sa according to the polarity of the dispersion amount of the input signal Is, and outputs the slope adjust signal Sa to the asymmetrical optical modulator 14 via the optical modulator bias voltage controller 113, to adjust that the asymmetrical optical modulator 14 is operated at the positive slope or the negative slope of the transfer function of the asymmetrical optical modulator 14 itself, making the polarity of the chirp parameter of the asymmetrical optical modulator 14 and the polarity of the dispersion amount opposite. At the same time, when the slope adjust signal Sa generated by the slope controller 111 is to make that the asymmetrical optical modulator 14 is operated at the negative slope of the transfer function, the slope controller 111 generates and outputs the polarity adjust signal Pr to the multi-level pulse amplitude modulator 12, to cause the polarity of the multi-level pulse amplitude modulation signal Pam generated by the multi-level pulse amplitude modulator 12 to be reversed, making the polarity of the multi-level pulse amplitude modulation signal Pam and the polarity of the optical modulate signal Lm different. On the contrary, when the slope adjust signal Sa generated by the slope controller 111 is to make that the asymmetrical optical modulator 14 is operated at the positive slope of the transfer function, because at this time the polarity of the multi-level pulse amplitude modulation signal Pam and the polarity of the optical modulate signal Lm are identical, according to practical circuit application requirement, the slope controller 111 may be designed not to output the polarity adjust signal Pr, or the slope controller 111 may be designed to still output the polarity adjust signal Pr to inform the multi-level pulse amplitude modulator 12 to maintain the polarity of the multi-level pulse amplitude modulation signal Pam generated by the multi-level pulse amplitude modulator 12 to be unchanged.

Next, the bias voltage offset controller 112 generates the bias voltage offset adjust signal Ba according to the magnitude of the dispersion amount of the input signal Is, and outputs the bias voltage offset adjust signal Ba to the asymmetrical optical modulator 14 via the optical modulator bias voltage controller 113, to adjust the offset between the bias voltage point of the asymmetrical optical modulator 14 and the quadrature point of the transfer function (for example, control a bias voltage of the asymmetrical optical modulator 14 via an electrode in the asymmetrical optical modulator 14 to adjust the bias voltage point), making the magnitude of the chirp parameter of the asymmetrical optical modulator 14 changed.

Figure 6:
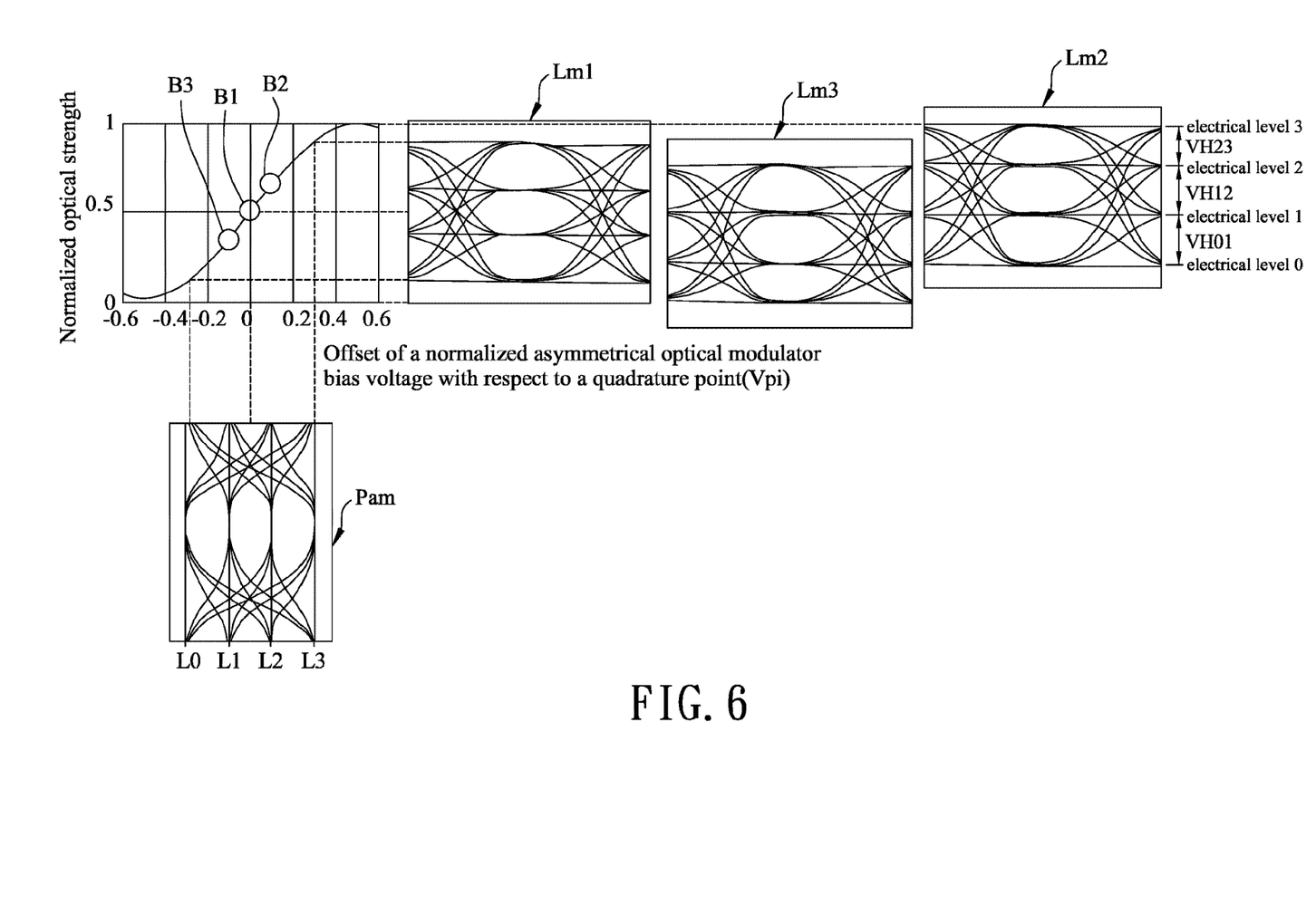
FIG. 6 is a diagram illustrating changes of an eye of an optical modulate signal when a bias voltage point of the asymmetrical optical modulator is located at different positions of the transfer function.

It is additionally noted that, further referring to FIG. 6, FIG. 6 illustrates changes of the eye of the optical modulate signal Lm when the asymmetrical optical modulator 14 is operated at the positive slope of the transfer function and the bias voltage point of the asymmetrical optical modulator 14 is located at different positions of the transfer function of the sine electrical-optical (E/O) conversion of the asymmetrical optical modulator 14. The optical modulate signal Lm is a PAM-4 optical signal, the eye thereof has an electrical level 0, an electrical level 1, an electrical level 2 and an electrical level 3, and has three eye openings, the electrical level 0 to the electrical level 1 is a first eye opening, the electrical level 1 to the electrical level 2 is a second eye opening, the electrical level 2 to the electrical level 3 is a third eye opening. A first eye Lm1 of the optical modulate signal Lm is the case that the bias voltage point is at the quadrature point of the positive slope of the transfer function (that is, at a parameter B1 of FIG. 6), because of sine symmetrical characteristics with respect to the quadrature point, a vertical height VH01 from the electrical level 0 to the electrical level 1, a vertical height VH12 from the electrical level 1 to the electrical level 2 and a vertical height VH23 from the electrical level 2 to the electrical level 3 are identical (that is, VH01=VH12=VH23, the optical communication system 10 may obtain the maximum signal-to-noise ratio (SNR)). However, because of nonlinearity of the transfer function, when the bias voltage point is above the quadrature point (that is, at a parameter B2 of FIG. 6), in a second eye Lm2 of the optical modulate signal Lm, the vertical height VH23 becomes small, but the vertical height VH01 becomes large, when the bias voltage point is below the quadrature point (that is, at a parameter B3 of FIG. 6), in a third eye Lm3 of the optical modulate signal Lm, the vertical height VH23 becomes large, but the vertical height VH01 becomes small, causing maximum signal-to-noise ratio which may be obtained by the optical communication system 10 to be lower, causing transmission performance of the communication system 10 to be degraded.

Therefore, before the multi-level pulse amplitude modulation signal Pam is transmitted to the asymmetrical optical modulator 14, it needs to adjust the first and second electrical levels of the multi-level pulse amplitude modulation signal Pam (that is, parameters L1, L2 of FIG. 6 respectively are the first and second electrical levels), to make the vertical heights VH01, VH12, VH23 still have the identical vertical height when the bias voltage point of the asymmetrical optical modulator 14 is made to offset from the quadrature point of the transfer function to adjust the magnitude of the chirp parameter of the asymmetrical optical modulator 14.

That is, finally, the electrical level adjustor 114 generates and outputs the electrical level adjust signal La according to the bias voltage offset adjust signal Ba to the multi-level pulse amplitude modulator 12, to cause the multi-level pulse amplitude modulator 12 to adjust the first electrical level L1 and the second electrical level L2 of the multi-level pulse amplitude modulation signal Pam according to the electrical level adjust signal La. In the present embodiment, when the asymmetrical optical modulator 14 is operated at the positive slope of the transfer function and the asymmetrical optical modulator 14 is controlled by the bias voltage offset adjust signal Ba so that the bias voltage point of the asymmetrical optical modulator 14 itself offsets to above the quadrature point of the positive slope of the transfer function, the multi-level pulse amplitude modulator 12 modulates the data input Di according to the electrical level adjust signal La, to cause the first electrical level L1 and the second electrical level L2 of the multi-level pulse amplitude modulation signal Pam generated by the multi-level pulse amplitude modulator 12 to offset toward the zeroth electrical level (that is, a parameter L0 is the zeroth electrical level in FIG. 6), but when the asymmetrical optical modulator 14 is controlled by the bias voltage offset adjust signal Ba so that the bias voltage point of the asymmetrical optical modulator 14 itself offsets to below the quadrature point of the positive slope of the transfer function, the multi-level pulse amplitude modulator 12 modulates the data input Di according to the electrical level adjust signal La, to cause the first electrical level L1 and the second electrical level L2 of the multi-level pulse amplitude modulation signal Pam generated by the multi-level pulse amplitude modulator 12 to offset toward the third electrical level (that is, the parameter L3 is the third electrical level in FIG. 6), thus when the bias voltage point offsets from the quadrature point, the vertical heights VH01, VH12, VH23 of the eyes of the optical modulate signal Lm still have the identical height, in turn promote transmission performance of the optical communication system 10.

Similarly, when the asymmetrical optical modulator 14 is operated at the negative slope of the transfer function, if the asymmetrical optical modulator 14 is controlled by the bias voltage offset adjust signal Ba so that the bias voltage point of the asymmetrical optical modulator 14 itself offsets to above the quadrature point of the negative slope of the transfer function, the multi-level pulse amplitude modulator 12 modulates the data input Di according to the electrical level adjust signal La, to cause the first electrical level L1 and the second electrical level L2 of the multi-level pulse amplitude modulation signal Pam generated by the multi-level pulse amplitude modulator 12 to offset toward the third electrical level L3; but if the asymmetrical optical modulator 14 is controlled by the bias voltage offset adjust signal Ba so that the bias voltage point of the asymmetrical optical modulator 14 itself offsets to below the quadrature point of the negative slope of the transfer function, the multi-level pulse amplitude modulator 12 modulates the data input Di according to the electrical level adjust signal La, to cause the first electrical level L1 and the second electrical level L2 of the multi-level pulse amplitude modulation signal Pam generated by the multi-level pulse amplitude modulator 12 to offset toward the zeroth electrical level L0, thus when the bias voltage point offsets from the quadrature point, each vertical height of the eyes of the optical modulate signal Lm is identical, to promote transmission performance of the optical communication system 10.

Figure 7:
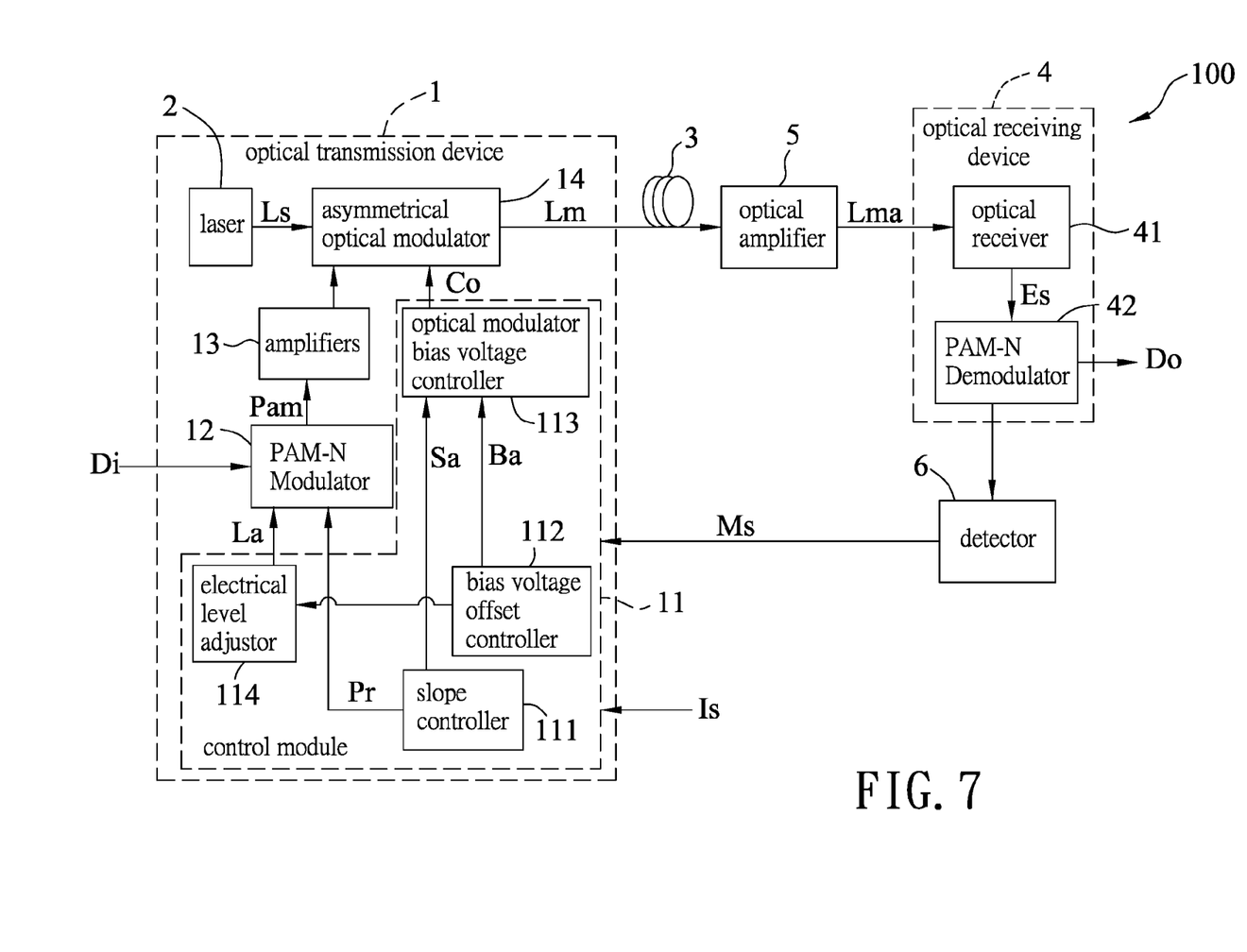
FIG. 7 is a block diagram illustrating a second embodiment that the optical transmission device is used to another optical communication system.

Referring to FIG. 7, in the second embodiment, the optical transmission device 1 is adapted to another optical communication system 100, the second embodiment is similar to the first embodiment, a difference therebetween lies in that, the optical communication system 100 is used to long distance transmission (for example, 40 km), and further includes an optical amplifier 5 and a detector 6; the optical receiver 41 connects the optical amplifier 5; the control module 11 further connects the detector 6.

The optical amplifier 5 connects the asymmetrical optical modulator 14 via the optical fiber 3 to receive the optical modulate signal Lm, and amplifies the optical modulate signal Lm to generate an optical amplified signal Lma.

The optical receiver 41 receives the optical amplified signal Lma from the optical amplifier 5, and converts the optical amplified signal Lma to another electrical signal Es and outputs the another electrical signal Es to the multi-level pulse amplitude demodulator 42. The multi-level pulse amplitude demodulator 42 demodulates the another electrical signal Es to generate the data output Do. In the present embodiment, the optical receiver 41 is an optical receiver based on one of Avalanche Photodiode (APD) and PIN Photodiode.

The detector 6 connects the multi-level pulse amplitude demodulator 42 and the control module 11, and generates a measuring signal Ms according to the data output Do and outputs the measuring signal Ms to the control module 11. The measuring signal Ms indicates one of a Bit Error Rate (BER), a Forward Error Coding (FEC) and a signal-to-noise ratio of the data output Do.

In the control module 11, the slope controller 111 further connects the detector 6 to receive the measuring signal Ms, and generates the slope adjust signal Sa according to the polarity of the dispersion amount of the input signal Is and the measuring signal Ms. The bias voltage offset controller 112 further connects the detector 6 to receive the measuring signal Ms, and generates the bias voltage offset adjust signal Ba according to the magnitude of the dispersion amount of the input signal Is and the measuring signal Ms. The electrical level adjustor 114 further connects the detector 6 to receive the measuring signal Ms, and generates and outputs the electrical level adjust signal La according to the measuring signal Ms and the bias voltage offset adjust signal Ba.

Specifically, an operation of the optical transmission device 1 of the second embodiment is similar to the operation of the optical transmission device 1 of the first embodiment, so similar contents are not repeated herein. In the second embodiment, in order to be used to long distance transmission, by that the optical amplifier 5 promotes the optical power to the optical receiver 41 or by that the optical receiver 41 uses APD, sensitivity of the optical receiver 41 is improved. However, a signal-dependent noise caused with the laser 2, the optical amplifier 5 or APD will lower linkage performance of the optical communication system 100. In order to reduce the signal-dependent noise, it needs to adjust the electrical levels in the multi-level pulse amplitude modulation signal Pam and offset the bias voltage point of the asymmetrical optical modulator 14 to below the quadrature point, to cause the vertical height VH23 of the optical modulate signal Lm to be maximum to improve the signal-dependent noise problem. Therefore, in the second embodiment, considering compromise between Inter symbol interference (ISI) due to optical fiber dispersion and the signal-dependent noise, the bias voltage offset controller 112 generates the bias voltage offset adjust signal Ba further according to the measuring signal Ms, the electrical level adjustor 114 generates the electrical level adjust signal La further according to the measuring signal Ms, to optimize linkage performance of the optical communication system 100. Moreover, the slope controller 111 generates the slope adjust signal Sa further according to the measuring signal Ms, to assure the slope adjust signal Sa generated by the slope controller 111 to conform with the requirement of the optical communication system 100. For example, when the slope adjust signal Sa initially generated by the slope controller 111 makes that the asymmetrical optical modulator 14 is operated at the positive slope of the transfer function, if at this time according to the measuring signal Ms the slope controller 111 knows that, the Bit Error Rate indicated by the measuring signal Ms is too large or the signal-to-noise ratio indicated by the measuring signal Ms is too small, it is shown that the slope adjust signal Sa initially generated does not conform with the requirement of the optical communication system 100, in turn the slope controller 111 adjusts the slope adjust signal Sa to make that the asymmetrical optical modulator 14 is operated at the negative slope of the transfer function, but the present disclosure is not limited thereto.

In conclusion, in the present disclosure, adjusting that the asymmetrical optical modulator 14 is operated at the positive slope or the negative slope of the transfer function of the asymmetrical optical modulator 14 itself is used to change the polarity of the chirp parameter of the asymmetrical optical modulator 14, and that the bias voltage point of the asymmetrical optical modulator 14 offsets from the quadrature point of the transfer function is used to change the magnitude of the chirp parameter of the asymmetrical optical modulator 14, so the chirp of the optical modulate signal Lm is not constant. As such, the optical modulate signal Lm transmitted out by the optical transmission device 1 of the present disclosure has the optimized chirp, may lower effect of dispersion caused by the optical fiber 3 on the transmission of the optical communication systems 10, 100, make the Dispersion-induced Optical Power Penalty received by the optical receiver 41 decreased, in turn promote transmission performance of the optical communication systems 10, 100 and increase optical transmission distance. At the same time, because the multi-level pulse amplitude modulation signal Pam has a plurality of electrical levels, in the optical communication system 10 without the signal-dependent noise, the electrical level adjustor 114 performs adjustment to make the vertical height of each eye opening of the optical modulate signal Lm identical, in turn promote the signal-to-noise ratio of the optical communication system 10 to promote transmission performance, and increase optical transmission distance. In addition, in the optical communication system 100 with the signal-dependent noise, the electrical level adjustor 114 performs adjustment to make the vertical height of each eye opening of the optical modulate signal Lm different, in turn promote the signal-to-noise ratio of the optical communication system 100 to promote transmission performance, and increase optical transmission distance.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An optical transmission device, comprising:
   a control module which is used to receive an input signal indicating a dispersion amount, and generate a control signal output comprising a slope adjust signal and a bias voltage offset adjust signal according to the input signal and an electrical level adjust signal changing as the bias voltage offset adjust signal changing, the slope adjust signal and the bias voltage offset adjust signal respectively changing as a polarity and a magnitude of the dispersion amount changing;

a multi-level pulse amplitude modulator which is used to receive a data input, and connects the control module to receive the electrical level adjust signal, and modulates the data input at least according to the electrical level adjust signal, to generate a multi-level pulse amplitude modulation signal; and an asymmetrical optical modulator which is used to receive an optical signal, and connects the multi-level pulse amplitude modulator and the control module to respectively receive the multi-level pulse amplitude modulation signal and the control signal output, the asymmetrical optical modulator being controlled by the slope adjust signal of the control signal output to be operated at one of a positive slope and a negative slope of a transfer function of the asymmetrical optical modulator itself, and being controlled by the bias voltage offset adjust signal of the control signal output to offset a bias voltage point of the asymmetrical optical modulator itself from a quadrature point of the transfer function, and modulating the multi-level pulse amplitude modulation signal to the optical signal to generate an optical modulate signal having a chirp, a polarity and a magnitude of the chirp respectively changing as the slope adjust signal and the bias voltage offset adjust signal changing.

2. The optical transmission device of claim 1, wherein
the control module generates a polarity adjust signal further according to the slope adjust signal, the polarity adjust signal changes as the slope adjust signal change; and the multi-level pulse amplitude modulator further receives the polarity adjust signal from the control module, and further modulates the data input according to the polarity adjust signal, to generate the multi-level pulse amplitude modulation signal.

3. The optical transmission device of claim 2, wherein the control module comprises:

a slope controller which connects the multi-level pulse amplitude modulator, and generates the slope adjust signal according to the polarity of the input signal of the dispersion amount, and generates and outputs the polarity adjust signal to the multi-level pulse amplitude modulator according to the slope adjust signal;

a bias voltage offset controller which generates the bias voltage offset adjust signal according to the magnitude of the dispersion amount of the input signal;

an optical modulator bias voltage controller which connects the asymmetrical optical modulator, the slope controller and the bias voltage offset controller, receives the slope adjust signal and the bias voltage offset adjust signal respectively from the slope controller and the bias voltage offset controller, and generates and outputs the control signal output to the asymmetrical optical modulator according to the slope adjust signal and the bias voltage offset adjust signal; and an electrical level adjustor which connects the multi-level pulse amplitude modulator and the bias voltage offset controller, and generates and outputs the electrical level adjust signal to the multi-level pulse amplitude modulator according to the bias voltage offset adjust signal.

4. The optical transmission device of claim 2, wherein
when the asymmetrical optical modulator is controlled by the slope adjust signal to be operated at the negative slope of the transfer function of the asymmetrical optical modulator itself, the control module generates and outputs the polarity adjust signal to the multi-level pulse amplitude modulator, to cause the polarity of the multi-level pulse amplitude modulation signal generated by the multi-level pulse amplitude modulator to be reversed.

5. The optical transmission device of claim 1, wherein
when the polarity of the dispersion amount is positive polarity, the chirp had by the asymmetrical optical modulator is negative polarity, when the polarity of the dispersion amount is negative polarity, the chirp of the asymmetrical optical modulator is positive polarity.

6. The optical transmission device of claim 1, wherein
the multi-level pulse amplitude modulation signal is a four-level pulse amplitude modulation signal, and the four-level pulse amplitude modulation signal has a zeroth electrical level, a first electrical level, a second electrical level and a third electrical level;

when the asymmetrical optical modulator is operated at the positive slope of the transfer function and is controlled by the bias voltage offset adjust signal so that the bias voltage point of the asymmetrical optical modulator itself offsets to above the quadrature point of the positive slope of the transfer function, the multi-level pulse amplitude modulator modulates the data input according to the electrical level adjust signal, to cause the first electrical level and the second electrical level of the multi-level pulse amplitude modulation signal generated by the multi-level pulse amplitude modulator to offset toward the zeroth electrical level; and when the asymmetrical optical modulator is operated at the positive slope of the transfer function and is controlled by the bias voltage offset adjust signal so that the bias voltage point of the asymmetrical optical modulator itself offsets to below the quadrature point of the positive slope of the transfer function, the multi-level pulse amplitude modulator modulates the data input according to the electrical level adjust signal, to cause the first electrical level and the second electrical level of the multi-level pulse amplitude modulation signal generated by the multi-level pulse amplitude modulator to offset toward the third electrical level.

7. The optical transmission device of claim 6, wherein
when the asymmetrical optical modulator is operated at the negative slope of the transfer function and is controlled by the bias voltage offset adjust signal so that the bias voltage point of the asymmetrical optical modulator itself offsets to above the quadrature point of the negative slope of the transfer function, the multi-level pulse amplitude modulator modulates the data input according to the electrical level adjust signal, to cause the first electrical level and the second electrical level of the multi-level pulse amplitude modulation signal generate by the multi-level pulse amplitude modulator to offset toward the third electrical level; and when the asymmetrical optical modulator is operated at the negative slope of the transfer function and is controlled by the bias voltage offset adjust signal so that the bias voltage point of the asymmetrical optical modulator itself offsets to below the quadrature point of the negative slope of the transfer function, the multi-level pulse amplitude modulator modulates the data input according to the electrical level adjust signal, to cause the first electrical level and the second electrical level of the multi-level pulse amplitude modulation signal generated by the multi-level pulse amplitude modulator to offset toward the zeroth electrical level.

8. The optical transmission device of claim 1, further comprising an amplifier which is connected between the multi-level pulse amplitude modulator and the asymmetrical optical modulator, amplifies the multi-level pulse amplitude modulation signal from the multi-level pulse amplitude modulator and outputs to the asymmetrical optical modulator.

9. The optical transmission device of claim 1, wherein the asymmetrical optical modulator is a Mach-Zehnder modulator, the Mach-Zehnder modulator is made of one of a $LiNbO_3$-based, a silicon and an Inp.

10. An optical communication system, comprising:
an optical transmission device, comprising
a control module which is used to receive an input signal indicating a dispersion amount and a measuring signal, and generate a control signal output comprising a slope adjust signal and a bias voltage offset adjust signal according to the input signal and the measuring signal, the slope adjust signal and the bias voltage offset adjust signal respectively changing as a polarity and a magnitude of the dispersion amount changing;
a multi-level pulse amplitude modulator which is used to receive a data input, and modulates the data input to generate a multi-level pulse amplitude modulation signal; and
an asymmetrical optical modulator which is used to receive an optical signal, and connects the multi-level pulse amplitude modulator and the control module to respectively receive the multi-level pulse amplitude modulation signal and the control signal output, the asymmetrical optical modulator being controlled by the slope adjust signal of the control signal output to be operated at one of a positive slope and a negative slope of a transfer function of the asymmetrical optical modulator itself, and being controlled by the bias voltage offset adjust signal of the control signal output to offset a bias voltage point of the asymmetrical optical modulator itself from a quadrature point of the transfer function, and modulating the multi-level pulse amplitude modulation signal to the optical signal to generate an optical modulate signal having a chirp, a polarity and a magnitude of the chirp respectively changing as the slope adjust signal and the bias voltage offset adjust signal changing;
an optical amplifier which connects the asymmetrical optical modulator via an optical fiber to receive the optical modulate signal, and amplifies the optical modulate signal, to generate an optical amplified signal;
an optical receiving device which connects the optical amplifier to receive the optical amplified signal, and generate a data output according to the optical amplified signal; and
a detector which connects the optical receiving device and the control module, and generates the measuring signal according to the data output and outputs the measuring signal to the control module, the measuring signal indicating one of a Bit Error Rate, a Forward Error Coding and a signal-to-noise ratio of the data output.

11. The optical communication system of claim 10, wherein the control module generates an electrical level adjust signal which changes as the bias voltage offset adjust signal changes further according to the bias voltage offset adjust signal and the measuring signal, and generates a polarity adjust signal which changes as the slope adjust signal changes further according to the slope adjust signal; and
the multi-level pulse amplitude modulator further connects the control module to receive the electrical level adjust signal and the polarity adjust signal, and modulate the data input further according to the electrical level adjust signal and the polarity adjust signal, to generate the multi-level pulse amplitude modulation signal.

12. The optical communication system of claim 11, wherein the control module comprises:
a slope controller which connects the detector to receive the measuring signal, and connects the multi-level pulse amplitude modulator, and generates the slope adjust signal according to the polarity of the dispersion amount of the input signal and the measuring signal, and generates and outputs the polarity adjust signal to the multi-level pulse amplitude modulator according to the slope adjust signal,
a bias voltage offset controller which connects the detector to receive the measuring signal, and generates the bias voltage offset adjust signal according to the magnitude of the dispersion amount of the input signal and the measuring signal,
an optical modulator bias voltage controller which connect the asymmetrical optical modulator, the slope controller and the bias voltage offset controller, receives the slope adjust signal and the bias voltage offset adjust signal respectively from the slope controller and the bias voltage offset controller, and generates and outputs the control signal output to the asymmetrical optical modulator according to the slope adjust signal and the bias voltage offset adjust signal, and
an electrical level adjustor which connects the detector to receive the measuring signal, and connects the multi-level pulse amplitude modulator and the bias voltage offset controller, and generates and outputs the electrical level adjust signal to the multi-level pulse amplitude modulator according to the measuring signal and the bias voltage offset adjust signal.

13. The optical communication system of claim 11, wherein
when the asymmetrical optical modulator is controlled by the slope adjust signal to be operated at the negative slope of the transfer function of the asymmetrical optical modulator itself, the control module generates and outputs the polarity adjust signal to the multi-level pulse amplitude modulator, to cause the polarity of the multi-level pulse amplitude modulation signal generated by the multi-level pulse amplitude modulator to be reversed.

14. The optical communication system of claim 10, wherein
when the polarity of the dispersion amount is positive polarity, the chirp had by the asymmetrical optical modulator is negative polarity,
when the polarity of the dispersion amount is negative polarity, the chirp of the asymmetrical optical modulator is positive polarity.

15. The optical communication system of claim 10, wherein the multi-level pulse amplitude modulation signal is a four-level pulse amplitude modulation signal, and the four-level pulse amplitude modulation signal has a zeroth electrical level, a first electrical level, a second electrical level and a third electrical level;

when the asymmetrical optical modulator is operated at the positive slope of the transfer function and is controlled by the bias voltage offset adjust signal so that the bias voltage point of the asymmetrical optical modulator itself offsets to above the quadrature point of the positive slope of the transfer function, the multi-level pulse amplitude modulator modulates the data input according to the electrical level adjust signal, to cause the first electrical level and the second electrical level of the multi-level pulse amplitude modulation signal generated by the multi-level pulse amplitude modulator to offset toward the zeroth electrical level; and when the asymmetrical optical modulator is operated at the positive slope of the transfer function and is controlled by the bias voltage offset adjust signal so that the bias voltage point of the asymmetrical optical modulator itself offsets to below the quadrature point of the positive slope of the transfer function, the multi-level pulse amplitude modulator modulates the data input according to the electrical level adjust signal, to cause the first electrical level and the second electrical level of the multi-level pulse amplitude modulation signal generated by the multi-level pulse amplitude modulator to offset toward the third electrical level.

16. The optical communication system of claim 15, wherein when the asymmetrical optical modulator is operated at the negative slope of the transfer function and is controlled by the bias voltage offset adjust signal so that the bias voltage point of the asymmetrical optical modulator itself offsets to above the quadrature point of the negative slope of the transfer function, the multi-level pulse amplitude modulator modulates the data input according to the electrical level adjust signal, to cause the first electrical level and the second electrical level of the multi-level pulse amplitude modulation signal generate by the multi-level pulse amplitude modulator to offset toward the third electrical level; and when the asymmetrical optical modulator is operated at the negative slope of the transfer function and is controlled by the bias voltage offset adjust signal so that the bias voltage point of the asymmetrical optical modulator itself offsets to below the quadrature point of the negative slope of the transfer function, the multi-level pulse amplitude modulator modulates the data input according to the electrical level adjust signal, to cause the first electrical level and the second electrical level of the multi-level pulse amplitude modulation signal generated by the multi-level pulse amplitude modulator to offset toward the zeroth electrical level.

17. The optical communication system of claim 10, further comprising an amplifier which is connected between the multi-level pulse amplitude modulator and the asymmetrical optical modulator, amplifies the multi-level pulse amplitude modulation signal from the multi-level pulse amplitude modulator and outputs to the asymmetrical optical modulator.

18. The optical communication system of claim 10, wherein the asymmetrical optical modulator is a Mach-Zehnder modulator, the Mach-Zehnder modulator is made of one of a $LiNbO_3$-based, a silicon and an Inp.

19. The optical communication system of claim 10, wherein the optical receiving device comprises an optical receiver which receives the optical amplified signal, the optical receiver is an optical receiver which is based on one of Avalanche Photodiode and PIN Photodiode.

* * * * *

UNITED STATES PATENT AND TRADEMARK OFFICE
CERTIFICATE OF CORRECTION

| | |
|---|---|
| PATENT NO. | : 11,942,993 B2 |
| APPLICATION NO. | : 17/784104 |
| DATED | : March 26, 2024 |
| INVENTOR(S) | : Kuen-Ting Tsai et al. |

It is certified that error appears in the above-identified patent and that said Letters Patent is hereby corrected as shown below:

On the Title Page

Item (45), "Date of Patent: *Mar. 26, 2024" should be changed to, --Date of Patent: Mar. 26, 2024--

"(*) Notice: Subject to any disclaimer, the term of this patent is extended or adjusted under 35 U.S.C. 154(b) by 38 days. This patent is subject to a terminal disclaimer." should be changed to, --(*) Notice: Subject to any disclaimer, the term of this patent is extended or adjusted under 35 U.S.C. 154(b)by 38 days.--

Signed and Sealed this
Thirtieth Day of April, 2024

*Katherine Kelly Vidal*

Katherine Kelly Vidal
*Director of the United States Patent and Trademark Office*